United States Patent
Breuer et al.

(10) Patent No.: US 10,919,560 B2
(45) Date of Patent: Feb. 16, 2021

(54) METHOD FOR PRODUCING A VARIABLE-LENGTH STEERING SHAFT

(71) Applicants: THYSSENKRUPP PRESTA AG, Eschen (LI); thyssenkrupp AG, Essen (DE)

(72) Inventors: Marius Breuer, Fishers, IN (US); Janick Durot, Widnau (CH); Bernhard Jäger, Wangen im Allgäu (DE)

(73) Assignees: thyssenkrupp Presta AG, Eschen (LI); thyssenkrupp AG, Essen (DE)

(*) Notice: Subject to any disclaimer, the term of this patent is extended or adjusted under 35 U.S.C. 154(b) by 306 days.

(21) Appl. No.: 16/083,244

(22) PCT Filed: Mar. 6, 2017

(86) PCT No.: PCT/EP2017/055122
§ 371 (c)(1),
(2) Date: Sep. 7, 2018

(87) PCT Pub. No.: WO2017/153306
PCT Pub. Date: Sep. 14, 2017

(65) Prior Publication Data
US 2019/0031226 A1    Jan. 31, 2019

(30) Foreign Application Priority Data
Mar. 7, 2016    (DE) ............... 10 2016 203 625.4

(51) Int. Cl.
*B29C 45/14* (2006.01)
*B62D 1/185* (2006.01)
(Continued)

(52) U.S. Cl.
CPC ........ *B62D 1/185* (2013.01); *B29C 45/14065* (2013.01); *B29C 45/14598* (2013.01);
(Continued)

(58) Field of Classification Search
None
See application file for complete search history.

(56) References Cited

U.S. PATENT DOCUMENTS 2,684,502 A * 7/1954 Paulve ............... F42B 5/307
86/19.5
2,689,755 A * 9/1954 Krotz ................ F16F 1/36
403/221
(Continued)

FOREIGN PATENT DOCUMENTS

DE    102013020599 A    6/2015
DE    102014103879 A    9/2015
(Continued)

OTHER PUBLICATIONS

English machine translation of JP2013-141957 by google patents (Year: 2020).*
(Continued)

*Primary Examiner* — Edmund H Lee
(74) *Attorney, Agent, or Firm* — thyssenkrupp North America, LLC

(57) ABSTRACT

A method may be employed to produce a variable-length steering shaft. The method may involve positioning a shaft core within a mold cavity of an injection molding tool coaxially with respect to a mold surface that delimits a toothing region, injecting molten plastic into the mold cavity between the shaft core and the mold surface of the mold cavity, removing a toothed shaft from the injection molding tool after the molten plastic has solidified, providing a hollow shaft and axially inserting the toothing region into an internal toothing of the hollow shaft. To make it possible to provide an improved sliding coating with the least possible manufacturing outlay, the injection of the molten plastic may be performed from one axial end region of the mold cavity.

13 Claims, 5 Drawing Sheets

(51) Int. Cl.
    *B62D 1/20*     (2006.01)
    *F16D 3/06*     (2006.01)
    *F16C 3/03*     (2006.01)
    *B62D 1/16*     (2006.01)
    *B29C 45/27*     (2006.01)
    *B29L 31/00*     (2006.01)

(52) U.S. Cl.
    CPC ............ *B29C 45/2708* (2013.01); *B62D 1/16* (2013.01); *B62D 1/20* (2013.01); *F16C 3/03* (2013.01); *F16D 3/06* (2013.01); *B29C 2045/2714* (2013.01); *B29K 2995/0087* (2013.01); *B29L 2031/75* (2013.01); *F16C 2223/42* (2013.01); *F16C 2226/80* (2013.01); *F16C 2326/24* (2013.01); *F16D 2250/0046* (2013.01); *F16D 2300/10* (2013.01)

(56) References Cited

U.S. PATENT DOCUMENTS

| | | | | |
|---|---|---|---|---|
| 3,559,581 A | * | 2/1971 | Kriz | B29C 45/2708 102/467 |
| 3,608,049 A | * | 9/1971 | Tavella | F16F 1/3605 264/229 |
| 5,824,348 A | * | 10/1998 | Fujiu | F16D 3/06 425/120 |
| 6,026,704 A | * | 2/2000 | Shibata | B29C 45/14491 280/777 |

FOREIGN PATENT DOCUMENTS

| | | |
|---|---|---|
| DE | 10 2014 105 822 A | 10/2015 |
| DE | 102014106259 A | 11/2015 |
| EP | 1752670 A | 2/2007 |
| ES | 2381826 A | 6/2012 |
| FR | 2432380 * | 4/1980 |
| JP | 2008 222016 A | 9/2008 |
| JP | 2008222016 * | 9/2008 |
| JP | 2013141957 A | 7/2013 |

OTHER PUBLICATIONS

English Translation of International Search Report issued in PCT/EP2017/055122, dated Apr. 25, 2017 (dated May 10, 2017).

\* cited by examiner

METHOD FOR PRODUCING A VARIABLE-LENGTH STEERING SHAFT

CROSS REFERENCE TO RELATED APPLICATIONS

This application is a U.S. National Stage Entry of International Patent Application Serial Number PCT/EP2017/055122, filed Mar. 6, 2017, which claims priority to German Patent Application No. DE 10 2016 203 625.4, filed Mar. 7, 2016, the entire contents of both of which are incorporated herein by reference.

FIELD

The present disclosure generally relates to steering shafts, including methods of producing variable-length steering shafts with injection molding devices.

BACKGROUND

DE 10 2014 105 822 A1 has disclosed a telescopable steering shaft which, in the steering system of a motor vehicle, serves for transmitting the steering torque from the steering wheel to the steering gear. To permit an adjustment of the steering wheel relative to the driver's position in a longitudinal direction, that is to say in the direction of the longitudinal axis, at least one shaft section between the steering wheel and the steering gear is designed to be telescopable and thus adjustable in length. The length-adjustable shaft section may form the driver-side steering spindle or the steering intermediate shaft between the steering spindle and the steering gear.

The steering shaft is of telescopic construction, having a first shaft part which is formed as a hollow shaft and which comprises an internal toothing and which comprises teeth extending in an axial direction, and having a second shaft part which is telescopable in said first shaft part and which is formed as a toothed shaft and which comprises an external toothing which, for the transmission of torque, engages in positively locking fashion into said internal toothing and permits a telescopic axial adjustment of the two shaft parts relative to one another.

To minimize the rotational play and improve the sliding characteristics during the telescopic movement, the toothing region of the toothed shaft at least partially has a sliding coating composed of plastic in the contact region with the hollow shaft. Said sliding coating is applied to a shaft core which is composed of metal, generally of steel or of an aluminum alloy. By means of the plastic which is softer and more elastic relative to steel or to the aluminum alloy, the rotational play is reduced, and friction is reduced. In this way, play-free, precise steering is made possible, and improved sliding characteristics are realized, such that a smooth and uniform longitudinal position of the steering wheel is possible without jerky disruption owing to stick-slip effects. Furthermore, the transmission of vibrations and the generation of noise is advantageously suppressed.

In order that, in mass production with high unit quantities, a consistent optimum function of a steering shaft of said type is ensured, the sliding coating must, throughout the entire production run, be applied to the shaft core with the least possible dimensional or shape deviations. In the case of the overmolding with plastic by injection molding, this firstly necessitates correspondingly exact positioning of the shaft core in the injection molding tool. Here, the positioning must be as far as possible exactly coaxial, wherein the longitudinal axis of the shaft core of cylindrical basic form corresponds over the axial length of the toothing region to the internally cylindrical form of the mold cavity of the injection mold, that is to say is centered within the mold surfaces, which delimit the toothing, of the mold cavity. Secondly, it must be ensured that, during the injection molding, as far as possible no defects occur in the plastics sliding layer that is applied in the process. These may be shaped defects such as deviations with regard to roundness, concentricity and wall thickness, and also injection defects such as flow seams resulting from flow fronts colliding with one another and the like.

JP 2013141957A describes a method for producing a variable-length steering shaft, in which method the injection of the molten plastic into the mold cavity between the shaft core and the mold surface of the mold cavity is performed via a single gate point, which is arranged in an axial direction within the toothing region. Through the gate point, the injection is performed into the mold cavity radially from the outside, wherein the flow front during the injection of the molten plastic propagates from the gate point in each case both axial and circumferential directions, such that, upon the inevitable collision on the side situated opposite the gate point, flow seams and other shaped defects can occur.

ES 2 381 826 A1 has likewise disclosed a method for producing a steering shaft with overmolding of a toothed shaft with a plastics sliding layer. Here, to improve the accuracy and to compensate shape defects of the toothing after the injection molding, a radial expansion is provided for calibration purposes in order to compensate injection defects. This approach is cumbersome and also cannot eliminate all injection defects such as may arise for example in the case of the injection molding method known from the above-cited JP 2013141957A.

Thus a need exists for a method which makes it possible to provide an improved sliding coating with the least possible manufacturing outlay.

DETAILED DESCRIPTION

Figure 1:
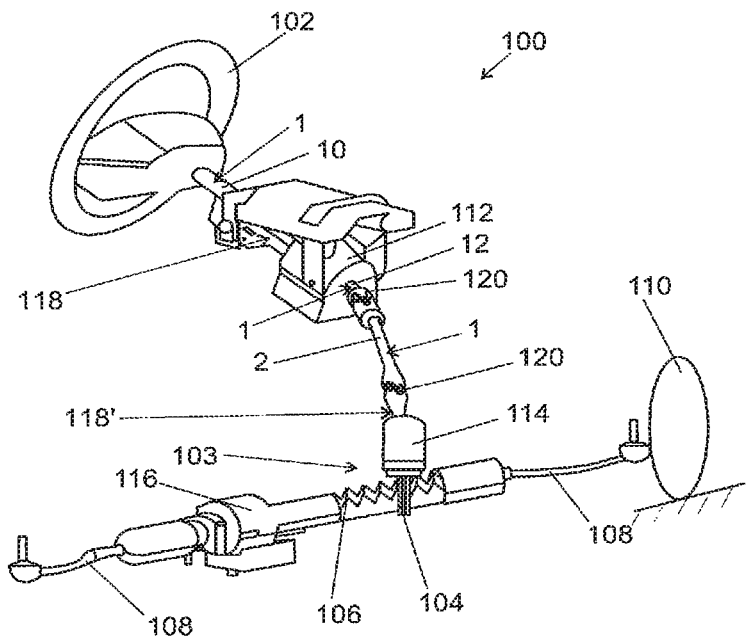
FIG. 1 is a perspective view of an example motor vehicle steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, a method may be employed to produce a variable-length steering shaft that comprises a hollow shaft with an internal toothing in which a toothed shaft which engages in positively locking fashion is arranged so as to be telescopable in an axial direction, which toothed shaft comprises a toothing region with teeth arranged on the outer circumference and extending in the axial direction. In the toothing region, a shaft core may be, in an injection molding process, overmolded with a sliding coating composed of thermoplastic material. One such example method may involve positioning the shaft core within a mold cavity of an injection molding tool coaxially with respect to a mold surface that delimits the toothing region, injecting molten plastic into the mold cavity between the shaft core and the mold surface of the mold cavity, removing the toothed shaft from the injection molding tool after the plastic has solidified, providing the hollow shaft and axially inserting the toothing region into the internal toothing.

In some examples, the injection of the molten plastic is performed from one axial end region of the mold cavity.

The mold cavity surrounds the core shaft in the toothing region, and in this case has a substantially hollow cylindrical basic shape with teeth formed in the circumferential direction, whereby the toothing region is delimited. In the method according to the invention, molten plastic is injected into said mold cavity from one axial end. From there, the plastic propagates along a flow path predominantly in one axial direction. Here, a single flow front which surrounds the shaft core in ring-shaped fashion moves in an axial direction through the mold cavity until said mold cavity is completely filled with plastic over the entire axial length of the toothing region. It is advantageous here that injection defects resulting from flow fronts which collide with one another in the circumferential direction in the region of the teeth are avoided. The mold surfaces which delimit the individual teeth in a radially outward direction are uniformly filled. In this way, the dimensional and shape accuracy of the toothing is improved in relation to the radial gate configuration known in the prior art. Injection defects such as flow seams and the like are substantially avoided.

Furthermore, the gate pins that may arise at a gate point depending on the form of nozzle used are situated outside the functional tooth surfaces, such that no impairment can arise, and no reworking of the toothed shaft is necessary.

An injection nozzle in embodiments known in injection molding can be arranged in a gate point. Therefore, below, the expressions "gate point" and "injection nozzle" are used equivalently, unless a different meaning is explicitly meant.

The injection is preferably performed through at least one gate point in an end wall of the mold cavity. Whereas the mold cavity is delimited at its outer circumference by the mold surface of the toothing, at least one end wall which delimits the mold cavity axially is provided at an end side. The gate system, with at least one gate point for the axial filling, according to the invention, of the mold cavity, is preferably arranged in an end wall, for example as an injection nozzle led axially through the end wall.

The end wall that has at least one gate point is preferably is situated opposite the free end of the toothed shaft, preferably with a predefined spacing. Thus, uniform overmolding of the end-side free end regions of the toothing can be ensured, the thickness of which overmolding corresponds to the end-side spacing, and good accessibility in the injection molding device can be ensured.

For the formation of a flow front which is uniform over the circumference, it is advantageous for the injection to be performed through a multiplicity of gate points arranged so as to be distributed over the circumference. Here, it is advantageous for two or more gate points to be arranged so as to be distributed uniformly, that is to say at uniform angular intervals with respect to one another, over the circumference. For this purpose, it is possible for two or more injection nozzles, which are arranged in an end wall on a coaxial circle, to open axially into the mold cavity.

One refinement of the method according to the invention provides that the injection is performed into a gate chamber, running in ring-shaped encircling fashion around the longitudinal axis at an end side, of the mold cavity. During the injection, through the one or more gate points, it is first of all the case that the gate chamber is filled, wherein a homogenization of the filling in a circumferential direction takes place. From the gate chamber, the flow front which is closed over the circumference travels as described in the axial direction through the entire mold cavity.

A gate chamber of said type may for example be formed between an encircling bevel at the free end of the shaft core and the end wall of the mold cavity. A chamfered bevel may be formed on the shaft core practically without significant additional manufacturing outlay. In the mold cavity, the shaft core bears, at the end side, sealingly against the end wall, wherein a gate chamber in the form of a gate channel remains free between the end wall and the bevel. Via at least one gate point, which is arranged for example in the end wall, the gate channel is filled first during the injection. From there, a flow front which is uniform over the circumference propagates in the axial direction in the mold cavity. After hardening, the plastic situated in the gate chamber forms the end-side plastics coating of the teeth.

Alternatively, the gate chamber may also be formed by a shoulder of reduced diameter or by a rounding on the free end of the shaft core.

The invention furthermore comprises an injection molding device for carrying out the method according to the invention, comprising an injection molding tool with a mold cavity which extends in an axial direction along the longitudinal axis and which is formed coaxially between a core shaft, arranged in the injection molding tool, and mold surfaces which, by means of a toothing region, delimits a coaxial toothing, and having at least one gate point for the injection of the molten plastic into the mold cavity.

The injection molding tool may alternatively and equivalently also be referred to as injection mold.

To carry out the method according to the invention, it is specifically provided that at least one gate point is formed in an axial end region of the mold cavity that delimits the toothing region. Preferably, the at least one gate point is arranged at an end side, with an axial injection direction.

In this way, the above-described advantageous filling of the mold cavity with molten plastic in a virtually exclusively axial direction is made possible.

It is advantageous that the injection molding tool is of segmented form with a multiplicity of mold segments which each extend over circumferential regions around the longitudinal axis and which are at least partially movable in a radial direction, that is to say in a direction orthogonal with respect to the direction of the longitudinal axis. To open the injection mold, the mold segments may be moved apart from one another in stellate fashion in the radial direction, such that the demolding takes place in the radial direction. In this way, the introduction of surface structures and the teeth, by means of which for example the sliding characteristics can be optimized, is possible. For example, by means of projections in the mold segments in the region of the tooth flanks, depressions can be formed in the plastics overmolding, such that the depressions in the tooth flanks form a lubricant-retaining volume.

In order to fill the mold cavity from one axial end in accordance with the invention, as described, the injection molding tool may have at least one end wall which delimits the mold cavity in the axial direction and which has at least one gate point. Preferably, multiple gate points are provided, which are preferably arranged so as to be distributed uniformly over the circumference.

It is advantageous that the injection molding tool has end walls which delimit the mold cavity in the axial direction, wherein at least one of the end walls is movable in the axial direction. For the demolding, at least one end wall is moved away from the fully overmolded toothed shaft in a longitudinal direction.

Between the positioning surfaces, which lie against the outer side of the shaft core, of the positioning elements, the shaft core can be centered on the longitudinal axis, and clamped coaxially in an accurately positioned manner, in the mold cavity. In this case, the positioning elements can be arranged within the axial extent of the toothing, that is to say in the functional region of the toothing that is overmolded with plastic in the injection molding tool.

If the positioning elements are arranged within the axial extent of the toothing, it is advantageously the case that surfaces of the toothing in the toothing region, which must in any case be machined in a precise and dimensionally accurate manner in order to ensure optimum telescopability, can at the same time be utilized for the positioning of the shaft core in the injection molding tool, specifically for the preferred coaxial, centered clamping in the mold cavity.

In this case, the support and positioning of the shaft core is realized in the functional region of the toothed shaft, specifically within the axial extent of the toothing region, which in the assembled steering shaft can slide along in the internal toothing of the hollow shaft. In this way, the exact coaxial, centered orientation of the core shaft in the mold cavity of the injection molding tool can be ensured without additional machined fitting surfaces. This results in a plastics sliding coating of the teeth which is uniformly thick over the circumference with high accuracy in a radial direction.

A refinement of the abovementioned positioning provides for a first group of positioning elements to be arranged parallel to a first radial plane of the mold cavity, and for at least one second group of positioning elements to be arranged parallel to a second radial plane axially spaced apart from the first radial plane. The first radial plane and the second radial plane intersect the longitudinal axis, as described, in each case at a first and at a second intersection point. Correspondingly, the shaft core is clamped in a centered manner in the first and in the second radial plane. Consequently, the toothing region is, between the intersection points, oriented exactly coaxially in the mold cavity.

Provision may however alternatively be made for the positioning of the shaft core to be realized at fitting surfaces formed spatially separately from the toothing. For example, the centering or orientation of the shaft core with respect to the mold cavity may be realized by means of the internal contour, that is to say the internal wall of the bore in the shaft core, if the shaft core is formed as a hollow shaft.

The injection according to the invention, which is performed from one axial end region, is not restricted to a particular positioning method. Although the above-described positioning methods are to be regarded as being highly suitable for the method according to the invention, they do not constitute the only practicable approach for positioning the shaft core in the mold cavity.

The injection molding device may comprise positioning elements in the mold cavity, which positioning elements permit the coaxial clamping of a shaft core. In the case of the known injection molding devices, the positioning elements are arranged such that, by means of their positioning surfaces, they clamp the shaft core between fitting surfaces formed outside the toothing region.

The formation of the fitting surfaces on the shaft core necessitates additional manufacturing outlay. Furthermore, tolerances may arise between the fitting surfaces and the toothing region, which tolerances impair the dimensional accuracy of the plastics coating. Therefore it is advantageous that at least one positioning element is arranged within the toothing region.

By means of this embodiment of the injection molding device, it is possible for the shaft core to be positioned and clamped in a positionally accurate manner within the mold surface delimiting the toothing in the mold cavity.

A refinement provides for at least one positioning element to be arranged on a slide which is movable radially relative to the mold cavity. For the positioning and clamping the shaft core can be centered and coaxially clamped by means of radially inwardly directed movement of the slide between the positioning elements.

At least one positioning surface is formed on a positioning element in the region of the free end thereof, which free end is movable against the shaft core from the outside. The positioning surface is, for the positioning and clamping, placed in contact with the shaft core in the toothing region in accordance with the invention. This yields the advantages described above.

In the various figures, identical parts are in all cases denoted by the same reference designations, and will therefore each also generally be mentioned only once.

FIG. 1 schematically illustrates a motor vehicle steering system 100, wherein a driver can use a steering wheel 102 to input a corresponding steering torque (steering moment) as a steering command into a steering shaft 1. The steering moment is transmitted via the steering shaft 1 to a steering pinion 104, which meshes with a toothed rack 106, which then in turn, by means of a displacement of the track rods 108, transmits the predefined steering angle to the steerable wheels 110 of the motor vehicle.

An electric power assistance means may be provided in the form of a power assistance means 112 coupled at the input side to the steering shaft 1, of a power assistance means 114 coupled to the pinion 104, and/or of a power assistance means 116 coupled to the toothed rack 106. The respective power assistance means 112, 114 or 116 couples an auxiliary torque into the steering shaft 1 and/or the steering pinion 104 and/or couples an auxiliary force into the toothed rack 106, whereby the driver is assisted in performing steering work. The three different assistance means 112, 114 and 116 illustrated in FIG. 1 show possible positions for the arrangement thereof.

Normally, only a single one of the illustrated positions is occupied with a power assistance means 112, 114 or 116. The auxiliary torque or the auxiliary force that is to be imported in order to assist the driver by means of the respective power assistance means 112, 114 or 116 is determined taking into consideration a steering moment input by the driver and ascertained by a torque sensor 118. Alternatively or in combination with the introduction of the auxiliary torque, the power assistance means 112, 114, 116 may introduce an additional steering angle into the steering system, which is added to the steering angle imparted by the driver by means of the steering wheel 102.

The steering shaft 1 comprises, at the input side, an input shaft 10 connected to the steering wheel 102 and, at the output side, and output shaft 12 connected to the toothed rack 106 via the steering pinion 104. The input shaft 10 and the output shaft 12 are coupled to one another in a rotationally elastic manner by means of a torsion bar (not shown in FIG. 1). Thus, a torque input into the steering shaft 10 by a driver using the steering wheel 102 always leads to a relative rotation of the input shaft 10 with respect to the output shaft 12, if the output shaft 12 does not rotate exactly synchronously with respect to the input shaft 10. Said relative rotation between input shaft 10 and output shaft 12 can be measured by means of a rotational angle sensor and, correspondingly, on the basis of the known torsional stiffness of the torsion bar, a corresponding input torque relative to the output shaft 12 can be determined. In this way, the torque sensor 118 is formed by means of the determination of the relative rotation between input shaft 10 and output shaft 12. A torque sensor 118 of said type is known in principle and may for example be realized by means of an electromagnetic sensor arrangement, as will be described further below, or by means of some other measurement of the relative rotation.

Correspondingly, a steering moment that is imparted by the driver to the steering shaft 1 or to the input shaft 10 using the steering wheel 102 will effect an introduction of an auxiliary torque by one of the power steering assistance means 112, 114, 116 only if the output shaft 12 is rotated relative to the input shaft 10 counter to the torsional resistance of the torsion bar.

The torque sensor 118 may also alternatively be arranged at the position 118', wherein then, the division of the steering shaft 1 into the input shaft 10 and output shaft 12, and the rotationally elastic coupling by means of the torsion bar, are correspondingly present at a different position, in order to be able, from the relative rotation of the output shaft 12 coupled to the input shaft 10 via the torsion bar, to determine a relative rotation and thus correspondingly an input torque and/or an auxiliary torque to be introduced.

The steering shaft 1 as per FIG. 1 furthermore comprises at least one cardanic joint 120 by means of which the profile of the steering shaft 1 in the motor vehicle can be adapted to the spatial conditions. The steering intermediate shaft of the steering shaft 1, which in the example illustrated is arranged between two cardanic joints 120 and connects the output shaft 12 to the pinion 104 of the steering gear 103, is designed according to the invention as a variable-length steering shaft 2.

Figure 2:
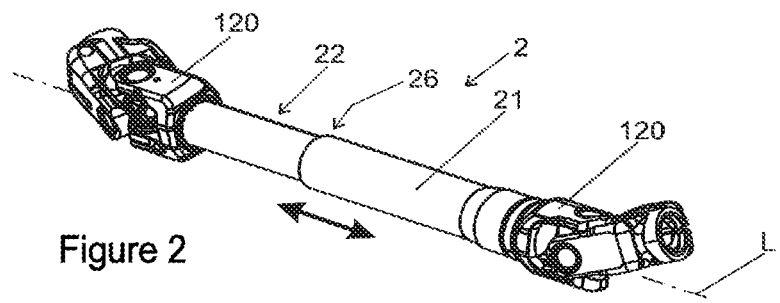
FIG. 2 is a perspective view of an example steering shaft.
Figure 3:
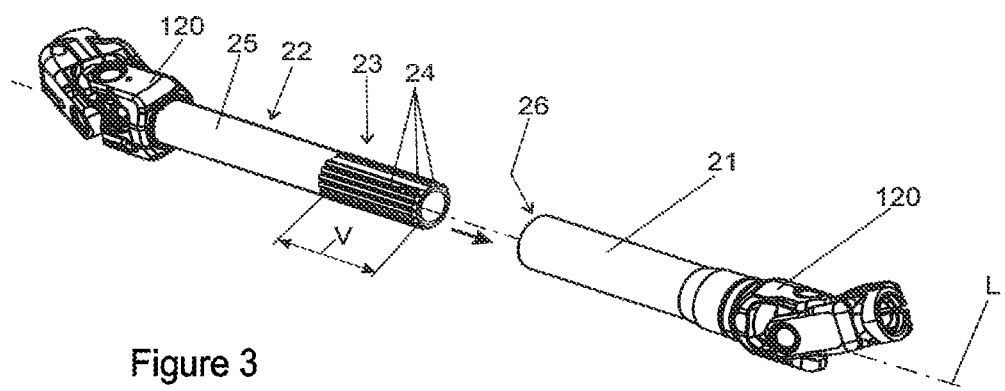
FIG. 3 is a perspective view of an example steering shaft as per FIG. 2, which has been axially pulled apart.

FIG. 2 and FIG. 3 show the steering shaft 2 in the assembled state (FIG. 2) and in a state in which they have been pulled apart in the axial direction (FIG. 3).

The steering shaft 2 comprises a hollow shaft 21 and a toothed shaft 22. The toothed shaft 22 comprises a toothing region 23 with a multiplicity of teeth 24 arranged on the outer circumference, which teeth extend in the direction of the longitudinal axis L, that is to say axially over the length V of the toothing region 23.

Figure 3A:
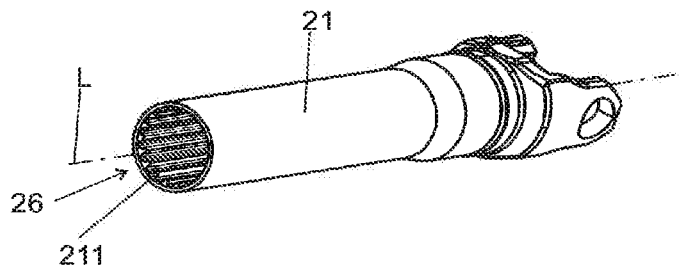
FIG. 3a is a perspective view of an example hollow shaft as per FIG. 3.

The hollow shaft 21 that is shown in a perspective view in FIG. 3a comprises a receiving opening 26 which is open toward the toothed shaft 22 and which comprises an internal toothing 211 in which the toothing region 23 can be received in positively locking fashion. To produce a connection fixed in terms of torque, the toothed shaft 22 is, proceeding from the situation illustrated in FIG. 3, inserted in an axial direction, as indicated by the arrow, in the direction of the longitudinal axis L into the receiving opening 26 of the hollow shaft 21, such that the assembled state illustrated in FIG. 2 is realized. In this assembled state, the toothed shaft 22 and the hollow shaft 21 can move relative to one another along the longitudinal axis L for the purposes of compensating spacing differences, as indicated by the double arrow.

It can be seen from FIG. 3 that the toothed shaft 22 comprises a cylindrical shank 25 outside the toothing region 23, wherein, in the example illustrated, the length V of the toothing region 23 corresponds to only a part of the total length of the toothed shaft 22.

Figure 4:
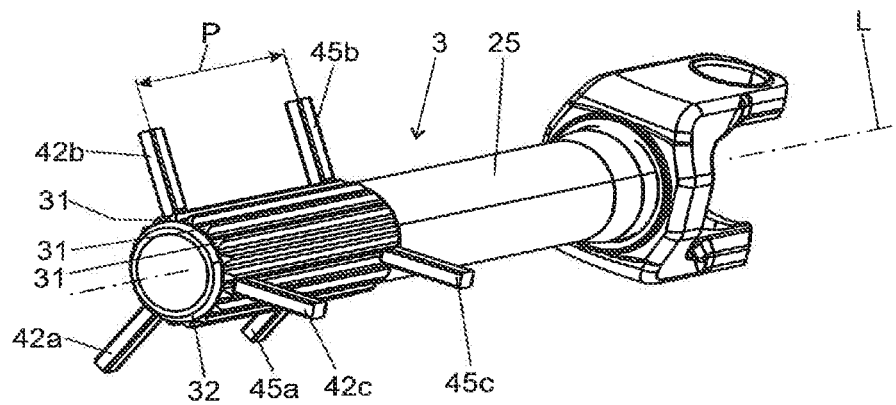
FIG. 4 is a perspective view of an example toothed shaft of a steering shaft as per FIG. 2 with positioning elements, prior to overmolding with plastic.

FIG. 4 shows a toothed shaft 22 in the partially fabricated state prior to the overmolding. Said toothed shaft is formed by a shaft core 3 which is composed preferably of metal, preferably of steel or an aluminum alloy. In the toothing region 23 of the finished toothed shaft 22 as per FIG. 5, the shaft core 3 comprises core teeth 31 which are arranged in the region of the teeth 24 of the finished toothing region 23, such that said core teeth constitute the main body is composed of steel, which main bodies are overmolded with plastic to form the finished teeth 24. The length of the core teeth 31 in the direction of the longitudinal axis L corresponds substantially to the length V of the fully overmolded teeth 24, specifically minus the wall thickness of a possible end-side, that is to say axial, overmolding of the core teeth 31.

Figure 5:
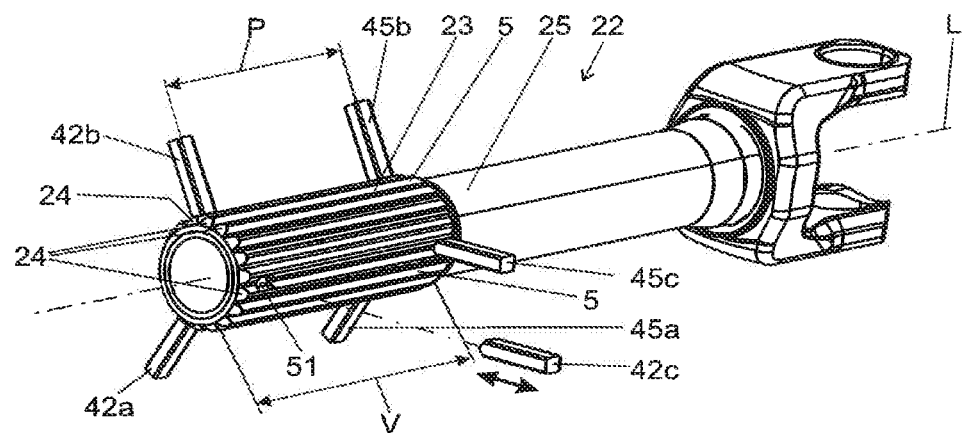
FIG. 5 is a perspective view of an example toothed shaft of a steering shaft as per FIG. 2 with positioning elements, after overmolding with plastic.

It can be seen from FIGS. 4 and 5 that the longitudinal axis L of the toothed shaft 22 and of the shaft core 3 is identical.

Figure 6:
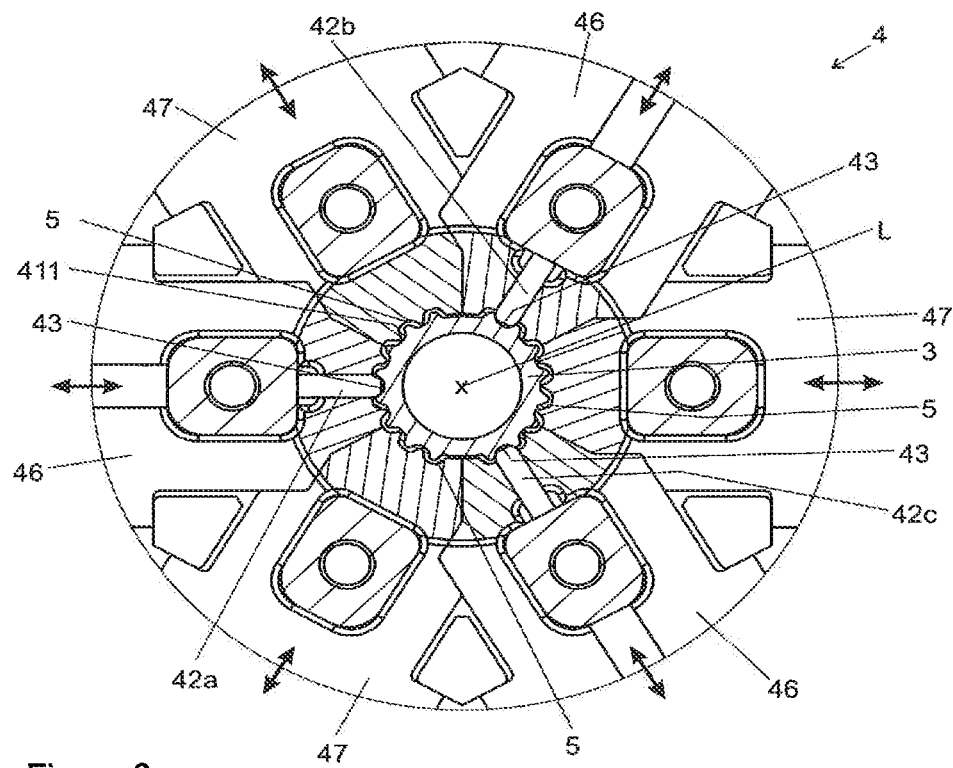
FIG. 6 is a cross-sectional view through an example injection molding tool with a toothed shaft clamped therein.

FIG. 6 shows a cross section perpendicular to the longitudinal axis L through an injection mold 4 for carrying out the method according to the invention. In particular, it can be seen in this illustration how the shaft core 3 is clamped in a centered manner, that is to say concentrically with respect to the longitudinal axis L, between positioning elements 42a, 42b and 42c. The arrangement of the positioning elements 42a, 42b and 42c is also schematically shown in FIG. 4 and FIG. 5, wherein the rest of the injection mold 4 has been omitted for the sake of better clarity.

Figure 7:
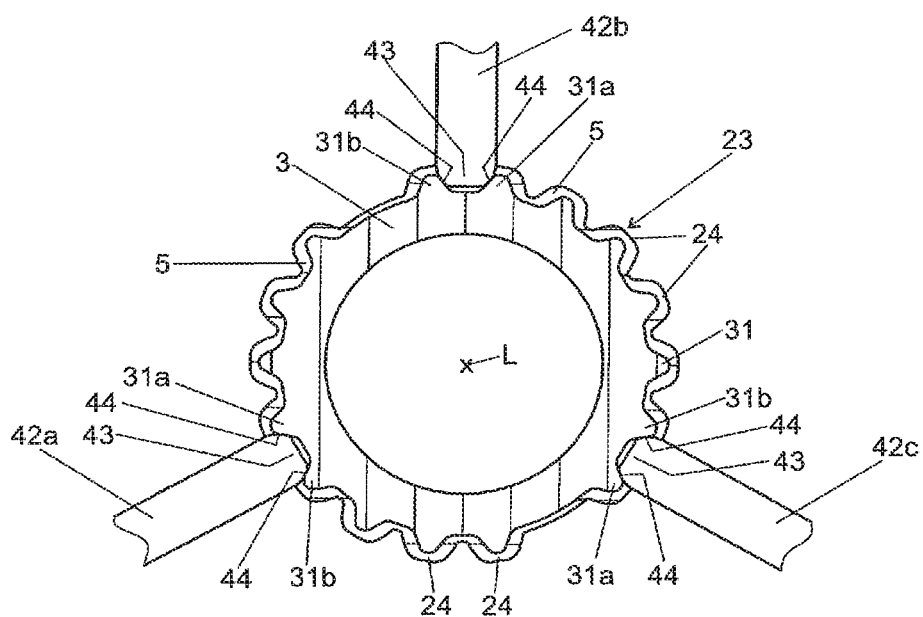
FIG. 7 is an enlarged cross-sectional view of the toothed shaft as per FIG. 6 clamped in the injection molding tool.

The positioning elements 42a, 42b and 42c are of pin-like form, with, in the illustrated example, a rectangular or square cross section, the dimension of which in the direction of the longitudinal axis L amounts to only a fraction of the length V of the toothing region 23. In the example shown, the three positioning elements 42a, 42b and 42c are arranged so as to be distributed uniformly over the circumference and are, with their free ends 43, directed radially inward toward the longitudinal axis L, such that the shaft core 3 is clamped coaxially in centered fashion relative to the longitudinal axis L in a mold cavity 41 between the free ends 43. In the injection mold 4, the shaft core 3 is surrounded in the toothing region 23 by the mold surface 411 that delimits the teeth 24, that is to say said mold surface 411 forms the negative impression of the toothing region 23. The mold surface 411 is likewise oriented coaxially with respect to the longitudinal axis L. This arrangement can be seen in detail in the enlarged illustration of FIG. 7.

The positioning elements 42a, 42b and 42c comprise positioning surfaces 43 in the region of their free ends 43. The positioning surfaces 44 are arranged such that they come into contact with the tooth flanks, facing toward one another in the circumferential direction, of adjacent core teeth 31a and 31b. In this way, the positioning elements 42a, 42b and 42c can, by way of the positioning surfaces 44, engage in each case in positively locking fashion between adjacent core teeth 31a and 31b from the outside. In this way, the shaft core 3 is, by means of the positioning elements 42a, 42b and 42c, clamped so as to be accurately angularly oriented with respect to a rotation about the longitudinal axis L within the mold cavity 41 and in a centered manner. The positioning surfaces 44 interact with the tooth flank, facing toward the positioning element 42a, 42b and 42c, of the respective adjacent core tooth 31a, 31b.

The positioning elements 42a, 42b and 42c are arranged in a first radial plane, specifically in the cross-sectional plane shown in FIG. 6. As can be seen from FIG. 4 and FIG. 5, second positioning elements 45a, 45b and 45c, which are in principle of identical design, are arranged in a second radial plane which comprises a spacing P (see FIG. 4) to the first radial plane in the direction of the longitudinal axis L. For the example shown, it is the case that P is smaller than L, such that all of the positioning elements 45a, 45b, 45c, 42a, 42b and 42c are arranged within the toothing region 23. In this way, the shaft core 3 is, at the intersection points of the first and of the second radial plane, centered exactly on the longitudinal axis L, and is, at the spacing P, oriented correspondingly exactly concentrically in the mold cavity 41.

To be able to clamp the shaft core 3 within the mold cavity 41, the positioning elements 42a, 42b and 42c are in each case attached to a slide 46 which is of segmented form and which is movable radially relative to the longitudinal axis L, as indicated in FIG. 6 by the double arrows. It is preferable for in each case two positioning elements 42a and 45a, 42b and 45b and also 42c and 45c arranged in the same circumferential position to be fastened in each case to one slide 46.

Arranged between the slides 46 in a circumferential direction are slides 47, which are likewise of segmented form and which, for the purposes of demolding, can be moved apart from one another, radially with respect to the longitudinal axis L, together with the slides 46, without colliding.

Figure 6A:
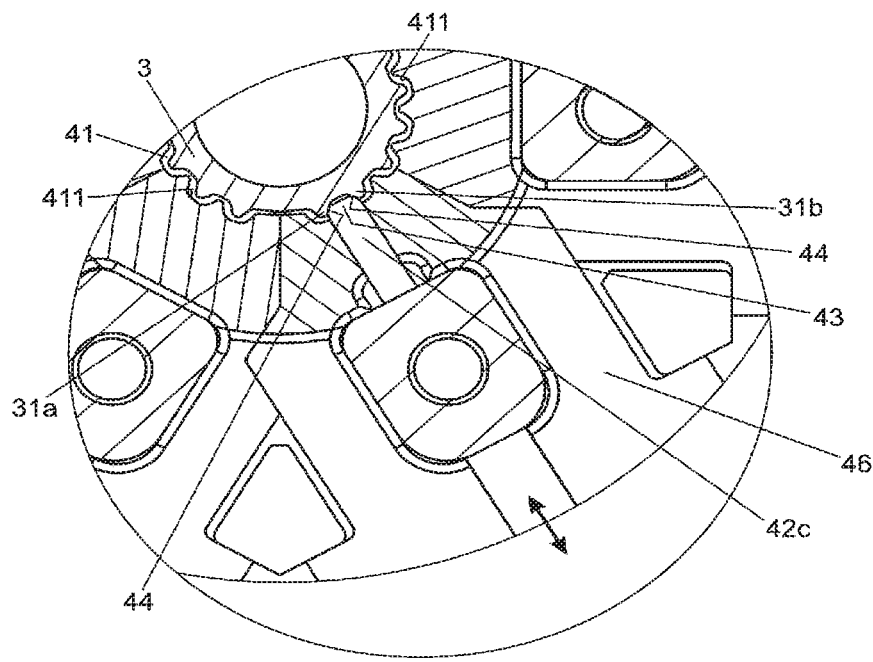
FIG. 6a is a detailed cross-sectional view through an example injection molding tool similar to FIG. 6 with a toothed shaft clamped therein, prior to injection of plastic.

If the slides 46 and 47 are moved radially apart from one another, a shaft core 3 can be introduced into the injection mold 4. Subsequently, the slides 46 and 47 are moved together in a radially inward direction, wherein the shaft core 3 is, as described above, clamped in a centered and angularly oriented manner in the mold cavity 41 between the positioning surfaces 44 of the positioning elements 45a, 45b, 45c, 42a, 42b and 42c. At the same time, as a result of the slides 46 and 47 being moved together, the injection mold 4 is closed, wherein the mold surface 411 is closed in a circumferential direction. The mold surface 411 and the mold cavity 41 can be seen particularly clearly in FIG. 6a, which illustrates a detail view of the cross section of the injection molding tool 4 illustrated in FIG. 6, with a toothed shaft 22 clamped therein, before the injection of the plastic.

Figure 8:
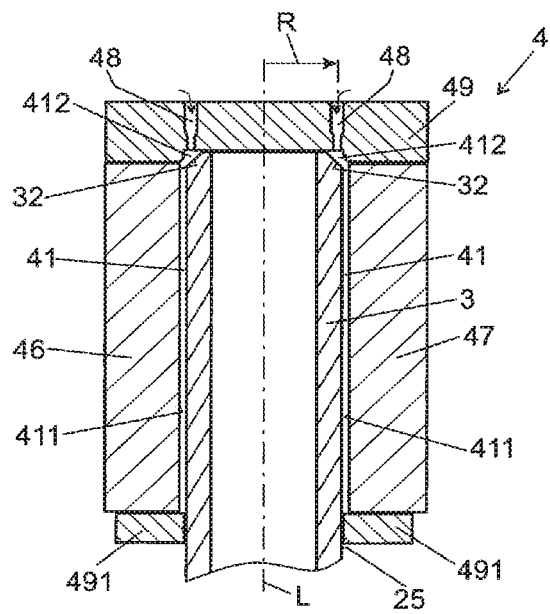
FIG. 8 is a longitudinal sectional view through an example injection molding tool in a closed state before injection of plastic.
Figure 9:
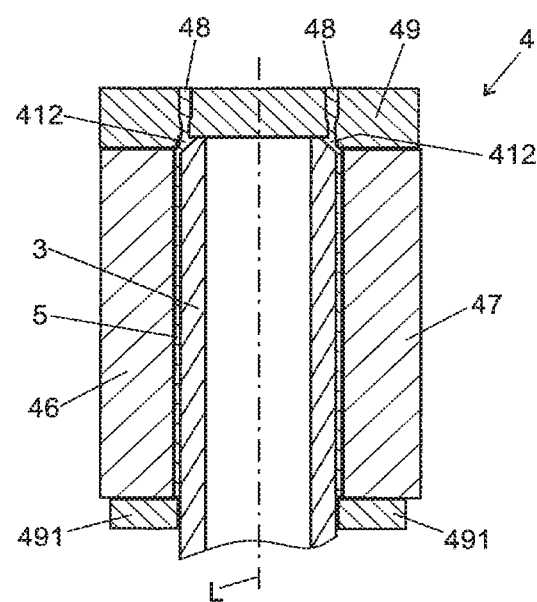
FIG. 9 is a longitudinal sectional view through the injection molding tool as per FIG. 8 in a closed state after injection of plastic.
Figure 10:
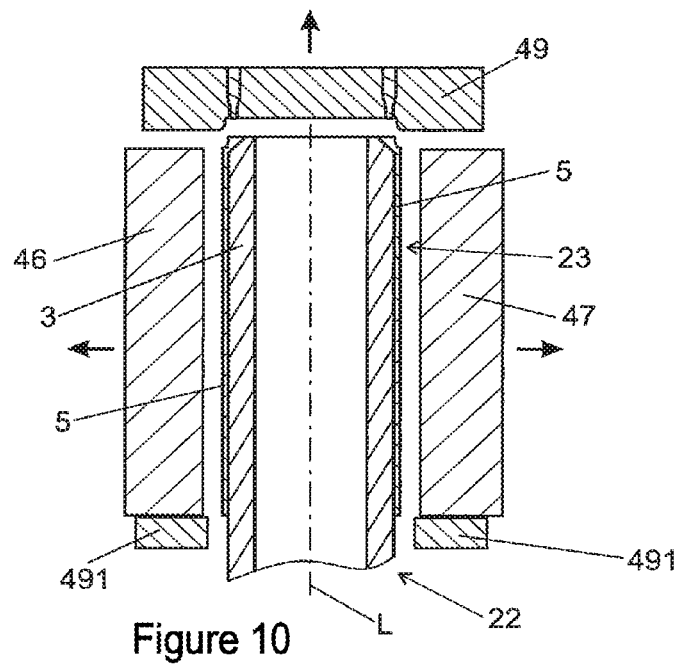
FIG. 10 is a longitudinal sectional view through an injection molding tool as per FIG. 9 in a demolded (opened) state.

FIGS. 8, 9 and 10 show in each case a longitudinal section along the longitudinal axis L through an injection mold 4, specifically in a closed state before the injection, that is to say in an unfilled state (FIG. 8), in a state filled with plastic (FIG. 9), and in an open state for demolding (FIG. 10).

The injection mold 4 has segment ring-shaped slides 46 and 47 which—as can be seen from FIG. 6—are arranged in stellate fashion around the longitudinal axis L and which, by means of their mold surfaces 411 situated radially at the inside, delimit the mold cavity 41, which surrounds the core shaft 3 in the toothing region 23. At the free end of the core shaft 3, at the top in FIGS. 8 to 10, the mold cavity 41 is closed by an end wall 49 which, as illustrated, bears at an end side against the core shaft 3. At a distance from the free end which corresponds to the length V of the toothing region 23, the mold cavity 41 is closed by a further end wall 491. The further end wall 491 may also be referred to as sealing slide. Said end wall 491 is preferably of segment-like form and can be moved apart radially outward in stellate fashion, such that the core shaft 3 can be placed into the injection mold 4 and, after the overmolding, the toothed shaft 22 can be removed. The end wall 491 delimits the flow of the plastics melt during the overmolding in the direction of the longitudinal axis L.

At its free end, the core shaft 3 has an encircling bevel 32, which can also be seen in FIG. 4. Between said bevel 32 and the end wall 49, there is formed a continuously ring-shaped gate chamber 412 which is open toward the mold cavity 41. The gate points 48 are arranged in the end wall 49 on a circle coaxial with respect to the longitudinal axis L and with radius R, specifically preferably at uniform angular intervals with respect to one another, such that they open at the end side into the gate chamber 412. Consequently, molten thermoplastic material can be injected through the gate points 48 in an axial direction into the gate chamber 412, as indicated in FIG. 8 by the arrows. The gate chamber 412 forms the axial end region of the mold cavity 41, and correspondingly, the injection of the plastic takes place according to the invention from the axial end region of the mold cavity 41, which is defined by its dimensions and the wall thickness of the plastics overmolding 5 that forms the sliding coating. The axial end region is preferably arranged in the region of the end side of the shaft core 3.

The plastic injected through the gate points 48 firstly fills the gate chamber 412 and subsequently moves with a uniform, closed flow front, which fills the mold cavity 41, which is coaxially ring-shaped with respect to the longitudinal axis L, over the entire circumference thereof, in the axial direction along the toothing region 23, until the opposite end wall 491 is reached. This filled state is illustrated in FIG. 9, in which the mold cavity 41 is completely filled with plastic, such that, in other words, the mold cavity 41 is completely filled with the plastics overmolding 5 that forms the sliding coating.

After the solidification, the finished toothed shaft 22 can be de-molded, as illustrated in FIG. 10. After the cooling and solidification of the plastics overmolding 5, the slides 46 and 47 are, for the purposes of demolding, moved radially apart from one another in stellate fashion, and the end wall 48 is moved in the axial direction away from the free end of the core shaft 3, as indicated in FIG. 9 by the radial and axial arrows. Then, the fully overmolded toothed shaft 22 can be removed from the injection mold 4.

Figure 11:
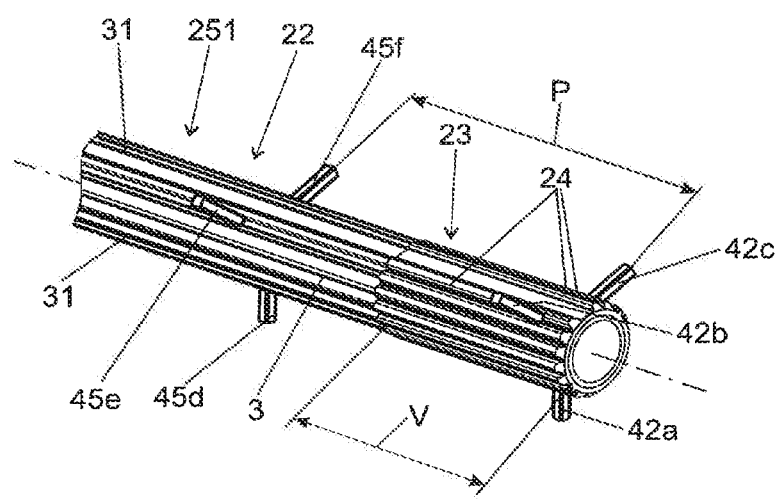
FIG. 11 is a perspective view of another example toothed shaft of a steering shaft with positioning elements, after overmolding with plastic.

FIG. 11 illustrates a toothed shaft 22 of a steering shaft 1 with positioning elements (42a, 42b, 42c, 45d, 45f, 45g), after the overmolding with plastic, in an alternative embodiment. The toothed shaft 22 comprises a core-toothed shaft 251 outside the toothing region 23. The positioning elements 42a, 42b and 42c are arranged in a first radial plane. The second positioning elements 45a, 45b and 45c, which are in principle of identical design, are arranged in a second radial plane which comprises a spacing P to the first radial plane in the direction of the longitudinal axis L. For the exemplary embodiment shown, it is the case that P is greater than V, such that only the positioning elements 42a, 42b and 42c are arranged within the toothing region 23. The positioning elements 45d, 45e and 45f are arranged outside the toothing region 23. The shaft core 3 comprises the core teeth 31, which extend over the entire shank 251, beyond the toothing region 23 in the direction of the longitudinal axis L. The shaft core 3 is preferably formed as a drawn profile or extruded profile. An advantage of this embodiment is that the first and second radial plane are at a great distance from one another, such that an oblique positioning of the clamped toothed shaft 22 is minimized, because a radial offset of the positioning elements in one radial plane in relation to the ideal state has little influence on the oblique positioning, because the supporting length is relatively large.

LIST OF REFERENCE DESIGNATIONS

1 Steering shaft
10 Input shaft
12 Output shaft
100 Motor vehicle steering system
102 Steering wheel
103 Steering gear
104 Steering pinion
106 Toothed rack
108 Track rod
110 Steerable wheel
112 Power assistance means
114 Power assistance means
116 Power assistance means
118 Torque sensor
118' Torque sensor
120 Joint
2 Variable-length steering shaft
21 Hollow shaft
22 Toothed shaft
23 Toothing region
24 Teeth
25, 251 Shank
26 Receiving opening
3 Shaft core
31 Core tooth
31a,b Adjacent core tooth
32 Chamfer
4 Injection mold/injection molding tool
41 Mold cavity
411 Mold surface
412 Gate chamber
42a,b,c Positioning element
43 Free end
44 Positioning surfaces
45a,b,c Positioning elements
46, 47 Slide
48 Gate point
49, 491 End wall
5 Plastics overmolding
L Longitudinal axis
V Length of toothing region
R Radius

What is claimed is:

1. A method for producing a variable-length steering shaft that includes a hollow shaft with an internal toothing in which a toothed shaft that engages in a positively locking fashion is disposed so as to be telescopic in an axial direction, with the toothed shaft including a toothing region with teeth disposed on an outer circumference and extending in the axial direction, wherein in the toothing region a shaft core is by way of an injection molding process overmolded with a sliding coating comprising thermoplastic material, the method comprising:
   positioning the shaft core within a mold cavity of an injection molding tool coaxially with respect to a mold surface that delimits the toothing region;
   injecting molten plastic through a gate point in an axial end wall of the mold cavity into the mold cavity between the shaft core and the mold surface of the mold cavity;
   removing the toothed shaft from the injection molding tool after the molten plastic has solidified; and
   providing the hollow shaft and axially inserting the toothing region into the internal toothing.

2. The method of claim 1 wherein the injection of the molten plastic is performed from only the gate point in the axial end wall of the mold cavity.

3. The method of claim 1 wherein the axial end wall is disposed opposite a free end of the toothed shaft.

4. The method of claim 1 wherein the gate point is one of numerous gate points through which the molten plastic is injected into the mold cavity, wherein the gate points are distributed about a circumference of the mold cavity.

5. The method of claim 1 wherein the gate point is configured as or cooperates with a gate chamber that is ring-shaped, is coaxial with a longitudinal axis of the shaft core, and is axially offset from the shaft core.

6. The method of claim 5 wherein the gate chamber is disposed between an encircling bevel at a free end of the shaft core and the axial end wall of the mold cavity.

7. The method of claim 1 comprising injecting the molten plastic into the mold cavity so as to form a single flow-front that surrounds the shaft core in a ring-shaped manner and travels in an axial direction while filling the mold cavity, thereby preventing formation of flow seams in a circumferential direction.

8. The method of claim 5 wherein injecting the molten plastic comprises:
   filling the gate chamber completely with the molten plastic; and then
   causing a circumferential flow front of the molten plastic to travel axially through the mold cavity.

9. The method of claim 1 wherein the gate point through which the molten plastic is injected is disposed radially at or radially within a circumference of the shaft core.

10. A method for producing a variable-length steering shaft that includes a hollow shaft with an internal toothing in which a toothed shaft is disposed so as to be telescopic in an axial direction, with the toothed shaft including a toothing region with teeth disposed on an outer circumference and extending in the axial direction, wherein in the toothing region a shaft core is by way of an injection molding process overmolded with a sliding coating comprising thermoplastic material, the method comprising:

positioning the shaft core within a mold cavity of an injection molding tool coaxially with respect to a mold surface that delimits the toothing region;

injecting molten plastic into the mold cavity between the shaft core and the mold surface of the mold cavity, wherein the molten plastic is injected into the mold cavity through a gate point disposed in an axial end wall of the mold cavity;

removing the toothed shaft from the injection molding tool after the molten plastic has solidified; and providing the hollow shaft and axially inserting the toothing region into the internal toothing.

11. The method of claim 10 comprising injecting the molten plastic into the mold cavity so as to form a single flow-front that surrounds the shaft core in a ring-shaped manner and travels in an axial direction while filling the mold cavity, thereby preventing formation of flow seams in a circumferential direction.

12. The method of claim 10 wherein injecting the molten plastic comprises:

filling a gate chamber completely with the molten plastic, wherein the gate point is configured as or cooperates with the gate chamber, with the gate chamber being ring-shaped and encircling a longitudinal axis at the axial end wall of the mold cavity; and then causing a circumferential flow front of the molten plastic to travel axially through the mold cavity.

13. The method of claim 10 wherein the gate point through which the molten plastic is injected is disposed radially at or radially within a circumference of the shaft core.

* * * * *